(12) United States Patent
Guigne

(10) Patent No.: US 9,075,154 B2
(45) Date of Patent: Jul. 7, 2015

(54) STATIONARY STAR-SHAPED ANTENNA METHOD FOR MANIPULATING FOCUSED BEAMFORMED, SHAPED FIELDS AND BEAMSTEERED ELECTROMAGNETIC SIGNAL FROM SUBTEL SEDIMENTARY STRATIGRAPHIC FORMATIONS DEEP IN THE EARTH

(75) Inventor: Jacques Y. Guigne, Paradise (CA)

(73) Assignee: ACOUSTIC ZOOM, INC. (CA)

( * ) Notice: Subject to any disclaimer, the term of this patent is extended or adjusted under 35 U.S.C. 154(b) by 438 days.

(21) Appl. No.: 13/636,850

(22) PCT Filed: Mar. 23, 2010

(86) PCT No.: PCT/CA2010/000426
§ 371 (c)(1),
(2), (4) Date: Jan. 14, 2013

(87) PCT Pub. No.: WO2011/116451
PCT Pub. Date: Sep. 29, 2011

(65) Prior Publication Data
US 2013/0113489 A1   May 9, 2013

(51) Int. Cl.
*G01V 3/00* (2006.01)
*G01V 3/12* (2006.01)
(Continued)

(52) U.S. Cl.
CPC . *G01V 3/12* (2013.01); *G01V 3/165* (2013.01); *G01V 3/104* (2013.01)

(58) Field of Classification Search
CPC ......... G01V 3/083; G01V 3/12; G01V 3/104; G01V 3/165; G01V 3/30; G01V 3/08; G01V 2210/6163; G01V 1/201; G01V 1/3835; G01V 1/306; G01C 15/00

USPC .......... 324/323, 332, 334, 376, 377; 376/8, 9, 376/38, 56, 121; 702/14, 16
See application file for complete search history.

(56) References Cited

U.S. PATENT DOCUMENTS 3,342,283 A * 9/1967 Pound .............................. 367/61
3,793,620 A * 2/1974 Miller ............................. 367/56
(Continued)

FOREIGN PATENT DOCUMENTS

AU       2002329890 B2    4/2003
CA       2 704 322        5/2009
(Continued)

OTHER PUBLICATIONS

Johnson et al., "Surface Geophysical Methods for Detection of Underground Mine Workings," Oct. 29, 2002, Symposium on Geotechnical Methods for Mine Mapping Verifications, Charleston, West Virgina.*
(Continued)

*Primary Examiner* — Jay Patidar
*Assistant Examiner* — Sean Curtis
(74) *Attorney, Agent, or Firm* — Adolph Locklar

(57) ABSTRACT

A method for electromagnetic geophysical surveying according to one aspect of the invention includes disposing a plurality of electromagnetic receivers in a selected pattern above an area of the Earth's subsurface to be evaluated. An electromagnetic source is repeatedly actuated proximate the electromagnetic receivers. Signals generated by the receivers, indexed in time with respect to each actuation of the at least one electromagnetic energy source, are recorded. The recorded signals are processed to generate an image corresponding to at least one point in the subsurface. The processing includes stacking recordings from each receiver for a plurality of actuations of the sources and beam steering a response of the receivers such that the at least one point is equivalent to a focal point of a response of the plurality of receivers.

15 Claims, 1 Drawing Sheet

(51) Int. Cl.
*G01V 3/165* (2006.01)
*G01V 3/10* (2006.01)

(56) References Cited

U.S. PATENT DOCUMENTS

| | | | | |
|---|---|---|---|---|
| 4,048,612 A | * | 9/1977 | Lawyer | 367/56 |
| 4,065,749 A | * | 12/1977 | Waters et al. | 367/56 |
| 4,393,488 A | * | 7/1983 | Gassaway et al. | 367/75 |
| 4,476,552 A | * | 10/1984 | Waters et al. | 367/56 |
| 4,554,649 A | * | 11/1985 | Herkenhoff et al. | 367/68 |
| 4,835,745 A | * | 5/1989 | Young et al. | 367/56 |
| 5,241,514 A | * | 8/1993 | Ehlers | 367/61 |
| 5,511,039 A | * | 4/1996 | Flentge | 367/56 |
| 5,532,976 A | * | 7/1996 | Schneider, Jr. | 367/38 |
| 6,100,696 A | * | 8/2000 | Sinclair | 324/339 |
| 6,462,549 B1 | * | 10/2002 | Curtis et al. | 324/323 |
| 6,476,608 B1 | * | 11/2002 | Dong | 324/323 |
| 7,242,637 B2 | * | 7/2007 | Van Den Beukel et al. | 367/38 |
| 7,280,070 B2 | * | 10/2007 | Pillai | 342/195 |
| 7,340,348 B2 | * | 3/2008 | Strack et al. | 702/14 |
| 7,505,361 B2 | * | 3/2009 | Sollner | 367/24 |
| 7,656,746 B2 | * | 2/2010 | De Kok et al. | 367/19 |
| 7,830,748 B2 | * | 11/2010 | Guigne et al. | 367/58 |
| 7,904,248 B2 | * | 3/2011 | Li et al. | 702/12 |
| 8,125,850 B2 | * | 2/2012 | Guigne et al. | 367/119 |
| 8,483,009 B2 | * | 7/2013 | Lee et al. | 367/43 |
| 8,867,307 B2 | * | 10/2014 | Guigne et al. | 367/56 |
| 2007/0075708 A1 | * | 4/2007 | Reddig et al. | 324/337 |
| 2009/0082970 A1 | * | 3/2009 | Andreis et al. | 702/8 |
| 2009/0121720 A1 | * | 5/2009 | Wahrmund et al. | 324/357 |
| 2009/0122643 A1 | * | 5/2009 | Guigne et al. | 367/38 |
| 2009/0122645 A1 | * | 5/2009 | Guigne et al. | 367/56 |
| 2009/0243613 A1 | * | 10/2009 | Lu et al. | 324/323 |
| 2010/0102820 A1 | * | 4/2010 | Martinez et al. | 324/334 |
| 2010/0142326 A1 | * | 6/2010 | Guigne et al. | 367/121 |
| 2011/0193554 A1 | * | 8/2011 | Pavlov et al. | 324/207.25 |
| 2014/0129150 A1 | * | 5/2014 | Guigne et al. | 702/16 |

FOREIGN PATENT DOCUMENTS

| | | |
|---|---|---|
| EP | 2 211 204 A2 | 7/2010 |
| WO | 2007046952 A2 | 4/2007 |
| WO | 2009009255 A1 | 1/2009 |

OTHER PUBLICATIONS

Extended European Search Report for European Application No. 10848148.2, mailed on Aug. 9, 2013 (4 pages).

International Preliminary Report on Patentability (Chapter 1 of the Patent Cooperation Treaty) and Written Opinion for International Application No. PCT/CA2010/000426, mailed on Oct. 4, 2012 (8 pages).

* cited by examiner

STATIONARY STAR-SHAPED ANTENNA METHOD FOR MANIPULATING FOCUSED BEAMFORMED, SHAPED FIELDS AND BEAMSTEERED ELECTROMAGNETIC SIGNAL FROM SUBTEL SEDIMENTARY STRATIGRAPHIC FORMATIONS DEEP IN THE EARTH

CROSS-REFERENCE TO RELATED APPLICATIONS

This application is a National Stage Entry of PCT/CA2010/000426, filed on Mar. 23, 2010.

BACKGROUND

1. Field of the Disclosure

The invention relates generally to the field of electromagnetic evaluation formations in the earth's surface. More specifically, the invention relates to methods for determining electromagnetic attributes in specific formations in the subsurface to a relatively high lateral and vertical resolution.

2. Description of the Related Art

Exploration for and exploitation of petroleum resources are entering a new phase wherein many methods are utilized to develop an integrated understanding of potential and discovered reservoir rocks. One of the overall goals of an integrated strategy for exploration and exploitation is to reduce the risk, especially that associated with drilling in new basins or harsh, offshore environments. Some traditional geophysical exploration methods for oil and gas (seismic, gravity and magnetic) have been tuned to exploit indirect indicators of petroleum occurrences—that is, they best delineate the structures that are potential petroleum reservoirs. Such traditional methods are not, in the first instance, direct indicators of petroleum.

Seismic methods developed over the past 60 years or so are highly refined and have led to a significant reduction in drilling risk to the point where approximately one in six exploration wells is deemed successful. In the past decade, special seismic methods (4D/time lapse and attribute characterization) have been developed to further reduce the risk of drilling. The major limitation in conventional geophysical exploration interpretation is that the physics of the methods inherently identifies contrasts in macro physical properties (velocity, density and magnetism). Thus, conventional geophysical exploration is traditionally best suited to delineate structural traps. Such methods have been successful in finding the major structures worldwide that contain oil and gas.

The primary properties of sedimentary rocks that lead to direct indication of oil and gas have to do with the porosity and permeability of the sediments, i.e., the nature of the pore fluid, the percentage of the rock volume that is fluid-filled, and the migration characteristics of the fluid. Unfortunately, while some progress has been made in utilizing the second order effects of pore fluids on seismic velocity and bulk density of the rock formations, these effects are still subtle and are traditionally subject to substantial uncertainty, especially for deeper reservoirs as are often found in offshore basins.

In contrast to the acoustic and magnetic properties, the electrical properties of sedimentary rocks are almost entirely determined by the volume and nature of the pore fluids. Virtually all common rock-forming minerals in sediments are electrical resistors, for instance, quartz ($SiO_2$) and mica, which are often used as electrical resistors in electronic microcircuits. Hence, because these rock-forming minerals are most often electrical resistors, the type of sediment (carbonate, clastic rock, or salt/anhydrite) has little impact on the bulk electrical properties of the rock and pore fluids. The electrical properties are determined almost exclusively by the amount and nature of the pore fluids. Furthermore, again unlike acoustic properties that vary only over a factor of 2 in the most extreme case (typically <10% or so), bulk electrical properties of sediments can vary by several orders of magnitude depending on the value of the porosity (0.1% to >20%) and the pore fluid (connate water, oil or gas). The noteworthy correlation is that while connate water is saline to some extent and thus substantially electrically conductive (compared to the rock forming minerals), petroleum fluids (i.e., oil and gas) are essentially non-conductors of electricity. This difference in conductivity leads to the potential to exploit this extreme property difference in a geophysical method that is a direct hydrocarbon indicator.

Those of skill in the art will recognize that significant literature exists pertaining to the electrical properties of sediments from both the petroleum well logging and mineral exploration fields. Empirical relationships have been developed that describe electrical resistivity compared to porosity and a large body of well log correlations to guide interpretation. These can be used to assist in determining the appropriate frequencies for any electromagnetic exploration method.

There are several electromagnetic techniques from the mineral sector repertoire that have recently been adapted for petroleum exploration. Prime among these is the use of towed dipole systems exploiting electromagnetic and magnetotelluric fields. These have found favor in both shallow water and deep marine settings. Typical electromagnetic marine surveys are extensively described in the literature and in an extensive listing of patents. The basic method involves a vessel which tows cables connected to electrodes deployed near the sea floor. The geophysical support vessel generates high power signals to the electrodes such that an alternating current of selected magnitude (magnitudes) and frequency (frequencies) flows through the sea floor and into the geological formations below the sea floor. Receiver electrodes are deployed on the sea floor at a range of offsets from the source electrodes and are coupled to a voltage measuring circuit. The voltages measured at the receiver electrodes are then analyzed to infer the structure and electrical properties of the geological formations in the subsurface.

Another well known technique for electromagnetic surveying of geological formations is known in the art as transient controlled source electromagnetic surveying. Typically an electric current, normally direct current (DC), is imparted into the seafloor. At a selected time, the electric current is switched off, switched on, or has its polarity changed (or one or more of such events occur in a coded sequence), and induced voltages and/or magnetic fields are measured, typically with respect to time over a selected time interval, at the Earth's surface, near the water bottom or water surface. The structure of the subsurface is inferred by the temporal and spatial distribution of the induced voltages and/or magnetic fields. These techniques are described in various publications such as by Strack, K.-M., 1992, Exploration With Deep Transient Electromagnetics, Elsevier, 373 pp. (reprinted 1999).

These traditional techniques for electromagnetic surveying suffer from a number of problems. In traditional methods, low signal to noise ratios may make proper analysis of the electromagnetic survey difficult. Further, such methods may be deficient in that they provide a low resolution picture of the subsurface Earth structures, again making proper analysis problematic. Finally, such traditional methods often are difficult to focus on particular areas of the survey, such as areas that appear to be likely to contain petroleum bearing strata. It follows that there is a need to develop an electromagnetic surveying method that addresses such issues.

SUMMARY OF THE INVENTION

A method for electromagnetic geophysical surveying according to one aspect of the invention includes disposing a plurality of electromagnetic receivers in a selected pattern above an area of the Earth's subsurface to be evaluated. An electromagnetic source is repeatedly actuated proximate the electromagnetic receivers. Signals generated by the receivers, indexed in time with respect to each actuation of the at least one electromagnetic energy source, are recorded. The recorded signals are processed to generate an image corresponding to at least one point in the subsurface. The processing includes stacking recordings from each receiver for a plurality of actuations of the sources and beam steering a response of the receivers such that the at least one point is equivalent to a focal point of a response of the plurality of receivers.

In one embodiment of the present invention, there is provided a method for electromagnetic geophysical surveying, comprising:
 disposing a plurality of electromagnetic receivers in a selected pattern above an area of the Earth's subsurface to be evaluated;
 repeatedly actuating at least one electromagnetic energy source proximate the electromagnetic receivers;
 recording signals generated by the receivers indexed in time with respect to each actuation of the at least one electromagnetic energy source; and
 processing the recorded signals to generate an image corresponding to at least one point in the subsurface, the processing including stacking recordings from each receiver for a plurality of actuations of the sources and beam steering a response of the receivers such that the at least one point is equivalent to a focal point of a response of the plurality of receivers.

Other aspects and advantages of the invention will be apparent from the following description and appended claims.

DESCRIPTION OF THE EMBODIMENT(S)

In one aspect of the present invention, a stationary emplacement of electromagnetic transmitters and receivers is placed above an area of the subsurface to be surveyed. The emplacement may include an array of electromagnetic transmitters and an array of electromagnetic receivers. In particular embodiments, the transmitters are repeatedly actuated and signals are repeatedly detected by the receivers in the respective arrays to coherently stack the detected signals to attain sufficient electromagnetic signal to noise ratio. The actuation and detection of signals may be repeated to obtain sufficient signal to noise ratio. Such actuation and detection typically allows for discrete beams and or shaped fields to be formed and directed deep into the subsurface.

Figure 1:
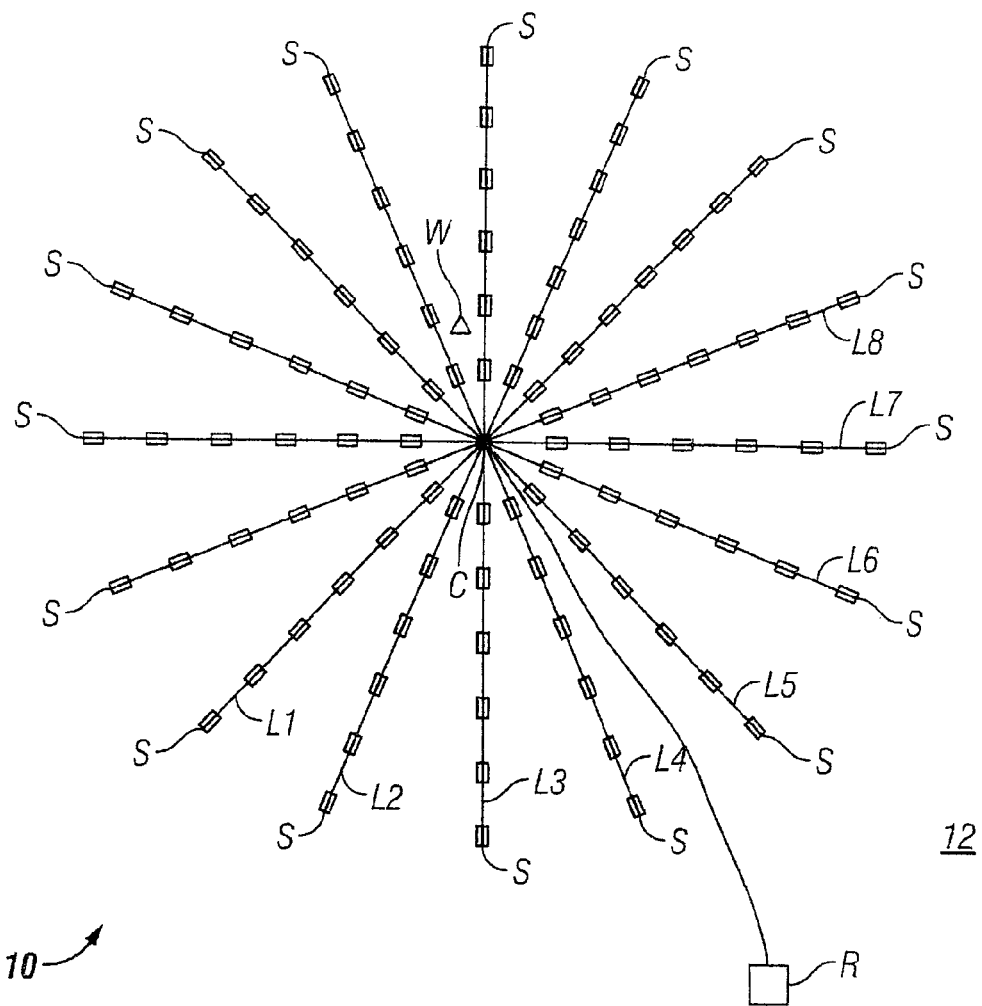
FIG. 1 shows an example of an electromagnetic receiver array used for subsurface imaging according to the invention.

One embodiment of an electromagnetic receiver array for use with the present invention is shown schematically at 10 in FIG. 1. In the embodiment shown in FIG. 1, array 10 may be disposed on the bottom of a body of water 12 such as a lake or the ocean, or in an area of the land surface below which an electromagnetic survey is to be conducted. Array 10 may include individual receiver cables, such as shown in FIG. 1 as L1 through L8. Cables L1 through L8 may include a plurality of spaced apart electromagnetic receiver modules S disposed along the length of each cable L1-L8. As would be recognized by one of ordinary skill in the art with the benefit of this disclosure, the number, location, and orientation of individual receiver cables and electromagnetic receiver modules may be altered as needed and is not limited to that shown in FIG. 1.

Electromagnetic energy source W, which in certain embodiments may be a transmitter antenna consisting of an array of many individual sources, may be disposed either proximate center C of receiver array 10 or throughout receiver array 10. Source W is actuated at selected times, and a time indexed record of the signals produced by each receiver in each module S may be recorded in recording unit R for later analysis.

Cables L1-L8 may be arranged in a radial pattern as shown in FIG. 1. Cables L1-L8 in the certain embodiments may be symmetrically arranged about center point C of array 10 and angularly displaced from each other by an angle of about 22½ degrees. In other embodiments, as described above, fewer or more cables may be used than is shown in FIG. 1. It is contemplated that in such other examples the angular displacement between each of the cables will be approximately equal, however equal angular displacement between cables is not a limit on the scope of the present invention. The radial cable arrangement shown in FIG. 1 may be advantageous in calculated beam steering of the spatially selective response. However, other geometric arrangements may be used that have spatially selective response according to the invention. For instance, the longitudinal spacing of receiver modules S and geometric arrangement may be related to the maximum electromagnetic energy frequency expected to be detected from the subsurface.

Figure 1A:
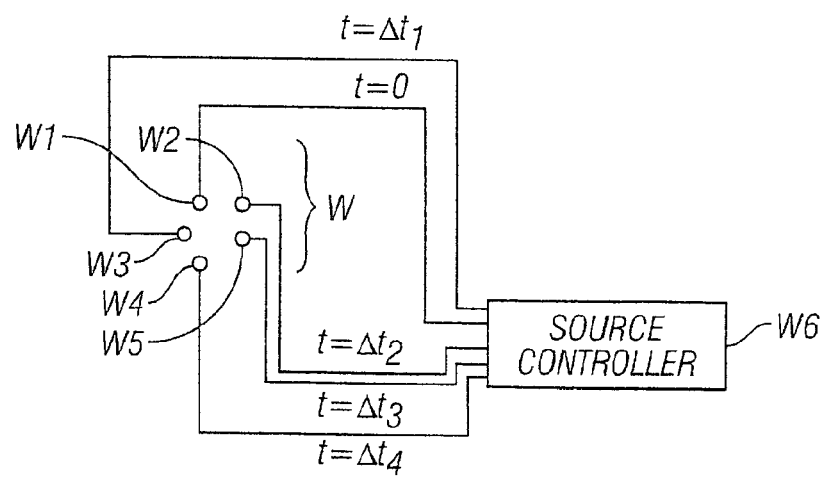
FIG. 1A shows an electromagnetic energy source array that may be used with the electromagnetic receiver array shown in FIG. 1.

FIG. 1A shows an example of source W in more detail. Source W may consist of a plurality of individual antennas such as explained above, shown at W1 through W5 arranged in a small-diameter, generally circular pattern. The individual sources W1-W5 may be actuated by source controller W6, which may be in operative communication with recording unit (R in FIG. 1) so that the signal recordings may be time indexed to the actuation time of source W. In the present example, source controller W6 may be configured to successively, individually (or in subsets or sub-combinations) actuate each source W1-W5 at a selected time delay (which may be zero or any other selected time delay) after the actuation of the first one of sources W1-W5. The time delay or excitation phases may be selected such that the energy output of the array of sources W1-W5 is oriented substantially along a selected direction. The time delay may also be calculated from resistivity spatial distribution determined by a previously-performed electromagnetic survey. In such examples, the directivity of source W may be used to further illuminate subsurface features identified during signal processing or otherwise.

In other examples, an array of transmitter antennas may be arranged substantially the same in configuration as receiver array 10 shown in FIG. 1. The antennas in the receiver array, as well as source W or any array of such sources may be any one or more of the following. For the transmitters, the antenna may be an electric or magnetic dipole. Such dipoles may be made, respectively, by spaced apart electrode or wire loops. The dipole moment of the antennas may be vertical or horizontal. The receivers in array 10 may be antennas as explained above, or may be magnetometers, or any combination thereof.

Electromagnetic energy may be generated by source W by passing alternating current through the antenna. Alternatively, electromagnetic energy may be generated by modulating direct current through the antenna. When using direct current, alternating current may be simulated by such methods as switching on the direct current, switching off the direct current, or reversing polarity of the direct current in a coded sequence.

Operating electromagnetic transmitters and receivers as explained above provides electromagnetic data not previously available concerning subsurface sedimentary structures, capturing off-specular electrical resistive scattered signals as well as the specular normal incidence returns via the beam steered footprint or shaped field. The processing simulates movement of the array through beam forming and beam steering techniques. Each image point or "spot" is formed by the electromagnetic energy backscattered in the direction of the corresponding beam with both the source and receiver arrays being highly sensitive and capable of being steered to the point of interest in the subsurface, especially in complex subtle porous structures. In effect, the detected signals are recorded and processed to generate an image corresponding to one or more image points in the subsurface by stacking recordings from receivers S for actuations of sources W and then beam steering a response of receivers S such that each image point is equivalent to a focal point of receivers S. During the electromagnetic survey technique according to certain embodiments of the present invention, a plurality of individual focal points may be selected through the area of the subsurface that is being examined.

Certain embodiments manipulate in a very stable highly coherent manner a fixed array of time controlled sources; the invention allows for the use of a broad span of frequencies, for example, from the quasi-stationary to the MHz range. These sources impart an electromagnetic field into the subsurface formations.

Unlike the scalar amplitude measurements typically made, the method of certain embodiments of the present invention make measurements of the vector electromagnetic field amplitudes. Amplitudes of vector electric and/or magnetic fields are deduced through the manipulation of the beam which captures and quantifies in the restricted footprint of the beam voltage differences induced in the antenna's electric and/or magnetic detectors as deployed at the surface, or on or above the sea floor. The electric and/or magnetic fields are induced in response to the electric field and/or magnetic field imparted into the subsurface, and inferences about the spatial distribution of conductivity of the subsurface are made from recordings of the induced electric and/or magnetic fields. High resolution gains are made by capturing much more subtle electric changes through the sweeping of the antenna's receiver beams as steered through the processing in a controlled manner using a stationary star shaped antenna array with associated adjacent energy sources with each individually beam steered. As, in certain embodiments, the apparatus is stationary on the Earth's surface or seafloor, temporal stacking to achieve sufficient signal to noise ratio for the beam forming and steering is easily obtained. This is in contrast to towed systems wherein temporal stacking is generally not possible or effective. Here the use of the term beamsteering includes both beamforming that is possible at high frequencies wherein phase delays across the array are utilized to form and steer beams on the one hand and on the other hand the formation of shaped fields in the quasi-stationary regime. The shaped transmitted fields are obtained by a combination of geometric disposition of the several source current loops together with the controlled phasing of the currents in the loops.

In performing a method according to certain embodiments of present invention, it may be desirable to form as many beams as required to sweep a particular targeted geological feature in the subsurface. The resulting images and electromagnetic attributes thus formed at a given location (at a beam focusing point or area of interest in the subject surface which one wishes to illuminate) may have as many independent points as there are independent beams formed. In some embodiments, it may be desirable to use iterative focusing strategies to enhance and improve the focusing and thereby further the knowledge of the environment. One such embodiment includes illuminating specific points or areas in the subsurface from different angles.

The use of prior knowledge of the structure of the subsurface is important to successfully steer and focus the seismic sensor array beams. Iterative focusing strategies may be used to enhance and improve the focusing and thereby further improve determination of the spatial distribution of electromagnetic properties in the subsurface.

The disclosed method relies and uniquely focuses on the vector propagated fields; highlighting the spatial resolution and the dominance of the propagated (wave) field, rather than the capturing of the diffused (attenuated) field as in certain other methods. Certain embodiments capture both the propagated wave field as well as the diffused attenuated field, but accentuates the wave (propagated) field as being the more dominant and richer in signal character.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A method for electromagnetic geophysical surveying, comprising:
   disposing a plurality of electromagnetic receivers in a selected pattern above an area of the Earth's subsurface to be evaluated;
   repeatedly actuating at least one electromagnetic energy source proximate the electromagnetic receivers;
   recording signals generated by the receivers indexed in time with respect to each actuation of the at least one electromagnetic energy source;
   processing the recorded signals to generate an image corresponding to at least one point in the subsurface, the processing including stacking recordings from each receiver for a plurality of actuations of the sources and beam steering a response of the receivers such that the at least one point is equivalent to a focal point of a response of the plurality of receivers; and
   simulating beam steering of the electromagnetic transmitters by one of selecting a geometric disposition of source current loops and controlling phasing of electric current in the loops.

2. The method of claim 1 wherein the selected pattern comprises lines of receivers radially extending from a center point of an array.

3. The method of claim 1 wherein a number of receivers in the selected pattern and a longitudinal spacing between receivers are related to a maximum electromagnetic energy frequency to be detected from the subsurface.

4. The method of claim 1 further comprising directing energy from the electromagnetic energy source toward a selected point in the subsurface.

5. The method of claim 4 wherein the directing comprises actuating each of a plurality of individual electromagnetic energy sources at a time causing an output thereof to be directed substantially toward the selected point.

6. The method of claim 1 wherein the beam steering comprises adding a selected time delay to the recording from each electromagnetic receiver.

7. The method of claim 6 wherein the selected time delay is calculated from resistivity spatial distribution determined by a previously performed electromagnetic survey analysis.

8. The method of claim 1 wherein each electromagnetic receiver comprises at least one of a vertical electric dipole, a vertical magnetic dipole, a horizontal electric dipole, a horizontal magnetic dipole and a magnetometer.

9. The method of claim 1 wherein the electromagnetic energy source is substantially collocated with a center of the selected pattern.

10. The method of claim 1 further comprising determining a spatial distribution of at least one constituent of a subsurface reservoir from the processed recorded signals, repeating the repeated actuation, recording and processing after a selected time period, and determining a change in the spatial distribution of at least one constituent from the repeated processing.

11. The method of claim 1 wherein the receivers and the source are substantially stationary during the actuating and detecting.

12. The method of claim 1 wherein the actuating the energy source comprises at least one of:
    passing alternating current through an antenna;
    passing switched direct current through an antenna, the switching comprising at least one of switching on, switching off, reversing polarity of switching in a coded sequence; and
    wherein the antenna comprises at least one of vertical electric dipole, a vertical magnetic dipole, a horizontal electric dipole and a horizontal magnetic dipole.

13. The method of claim 1 wherein the electromagnetic energy source comprises an array of electromagnetic transmitters disposed in a selected pattern.

14. The method of claim 13 wherein the actuating comprises applying a selected time delay to the actuation of selected ones of the transmitters so as to beam steer energy output of the array.

15. The method of claim 13 wherein the selected pattern comprises the transmitters being dispersed within the plurality of electromagnetic receivers.

* * * * *